US012779681B2

(12) United States Patent
Xie et al.

(10) Patent No.: US 12,779,681 B2
(45) Date of Patent: Nov. 3, 2026

(54) ROBOTIC ARM CONTROL METHOD AND INTELLIGENT MOBILE DEVICE USING THE SAME

(71) Applicant: UBTECH ROBOTICS CORP LTD, Shenzhen (CN)

(72) Inventors: Shengwen Xie, Shenzhen (CN); Ligang Ge, Shenzhen (CN); Chunjiang Fu, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 8 days.

(21) Appl. No.: 19/026,356

(22) Filed: Jan. 17, 2025

(65) Prior Publication Data

US 2025/0326114 A1 Oct. 23, 2025

(30) Foreign Application Priority Data

Apr. 17, 2024 (CN) ........................ 202410464058.5

(51) Int. Cl.
*B25J 9/16* (2006.01)
*B25J 9/00* (2006.01)

(52) U.S. Cl.
CPC .......... *B25J 9/1633* (2013.01); *B25J 9/0084* (2013.01)

(58) Field of Classification Search
None
See application file for complete search history.

(56) References Cited

U.S. PATENT DOCUMENTS

2016/0052128 A1* 2/2016 Zimmermann ........ B25J 9/1633 901/4
2019/0168383 A1* 6/2019 Haddadin ................ B25J 9/163
2021/0138639 A1* 5/2021 de Lange ................. B25J 9/163
2024/0017407 A1* 1/2024 Xu ......................... A61H 7/004
2024/0181633 A1* 6/2024 Zeng ...................... B25J 9/1653
2025/0086341 A1* 3/2025 Abe ....................... B25J 9/1664

FOREIGN PATENT DOCUMENTS

WO WO-2022166329 A1 * 8/2022 ............. B25J 18/00

* cited by examiner

*Primary Examiner* — Nhi Q Bui

(57) ABSTRACT

A robotic arm control method and an intelligent mobile device using the same are provided. The method includes: obtaining N end forces applied to end-effectors of N robotic arms of a robot, in response to detecting that the N robotic arms clamp the same object, where N is a natural number larger than or equal to 2; performing, according to the N end forces, an admittance control for eliminating an internal stress of the N end-effectors on the N robotic arms; and adjusting, according to results of the admittance control on the N robotic arms, joint angles of the N robotic arms. Through the above-mentioned method, the success rate of performing tasks can be improved.

20 Claims, 5 Drawing Sheets

ROBOTIC ARM CONTROL METHOD AND INTELLIGENT MOBILE DEVICE USING THE SAME

CROSS REFERENCE TO RELATED APPLICATIONS

The present disclosure claims priority to Chinese Patent Application No. 202410464058.5, filed Apr. 17, 2024, which is hereby incorporated by reference herein as if set forth in its entirety.

TECHNICAL FIELD

The present disclosure relates to intelligent mobile device technology, and particularly to a robotic arm control method and an intelligent mobile device using the same.

BACKGROUND

With the development of science and technology, various equipment is getting more and more intelligent. For example, the cleaning function is integrated into the robot so that the robot has a cleaning function, the function of clamping objects is integrated into the robot so that the robot has a carrying function, and the like.

In practical applications, tasks such as carrying or assembling objects can be realized through robotic arms. Although the task such as carrying some objects can be successfully performed by a single robotic arm, the task involving large objects or heavy objects can only be performed by dual robotic arms.

However, in practical applications, when a task is performed by dual robotic arms, the task may fail to perform, resulting in a low success rate.

BRIEF DESCRIPTION OF DRAWINGS

To describe the technical schemes in the embodiments of the present disclosure more clearly, the following briefly introduces the drawings required for describing the embodiments or the prior art.

DETAILED DESCRIPTION

Figure 1:
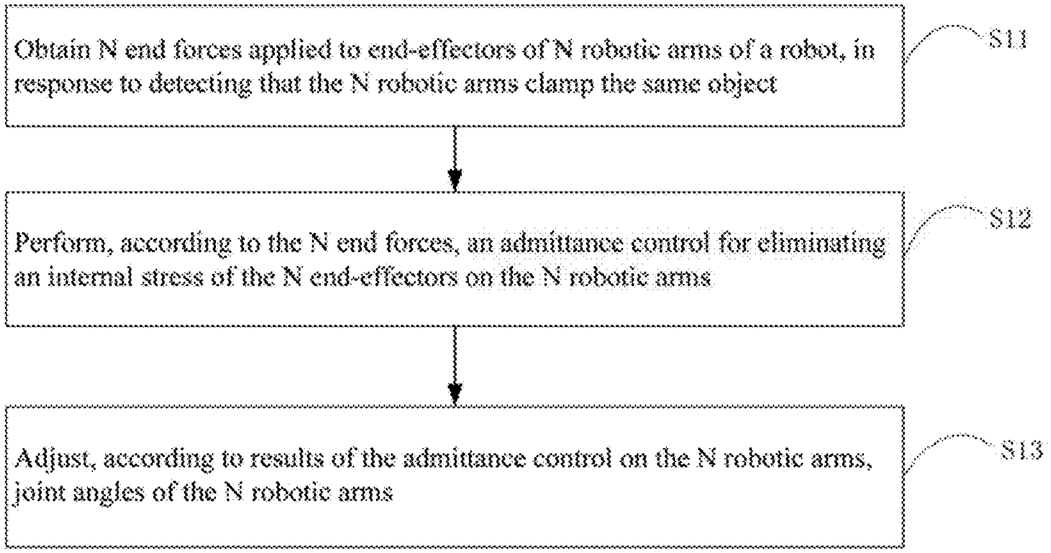
FIG. 1 is a flow chart of a robotic arm control method according to an embodiment of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

In addition, in the specification and the claims of the present disclosure, the terms "first", "second", and the like in the descriptions are only used for distinguishing, and cannot be understood as indicating or implying relative importance.

References such as "one embodiment" and "some embodiments" in the specification of the present disclosure mean that the particular features, structures or characteristics described in combination with the embodiment(s) are included in one or more embodiments of the present disclosure. Therefore, the sentences "in one embodiment," "in some embodiments," "in other embodiments," "in still other embodiments," and the like in different places of this specification are not necessarily all refer to the same embodiment, but mean "one or more but not all embodiments" unless specifically emphasized otherwise.

At present, robots with robotic arms can assist people in completing more and more work. If the working robot is a single-arm robot, usually only the force at the end-effector the arm needs to be considered to successfully perform the corresponding task. However, if the working robot is a dual-arm robot, and the forces at the end-effectors of the two arms are still considered independently without considering the internal stress at the end-effectors of the two arms, the failure to perform tasks may occur.

The term "internal stress" means that during the operation of the dual robotic arms, the force applied by one of the arms is not used for the movement of an object or for balancing the gravity of the object, but is offset by the force in the opposite direction that is generated by the other of the arms. After the dual robotic arms clamp the object, if the clamper (i.e., the end-effector of the robotic arm) and the robotic arm can move to the specified position without error, no internal stress will appear. However, there will definitely be control errors in the actual operation process, and even a very small error will generate a large internal stress. In particular, the robotic arms are rigid bodies. When the two rigid bodies are in rigid contact, the internal stress will become very large, which will cause the clamping operation of the dual robotic arms to fail.

In order to improve the success rate of performing tasks through the robotic arms, the embodiments of the present disclosure provide a robotic arm control method. In the method, when two or more robotic arms are detected to clamp the same object, admittance control will be performed on these robotic arms to eliminate the internal stress of these robotic arms, thereby helping to improve the success rate of the robotic arms in performing clamping tasks.

The robotic arm control method provided in the embodiments of the present disclosure is described below in conjunction with the drawings.

Figure 4:
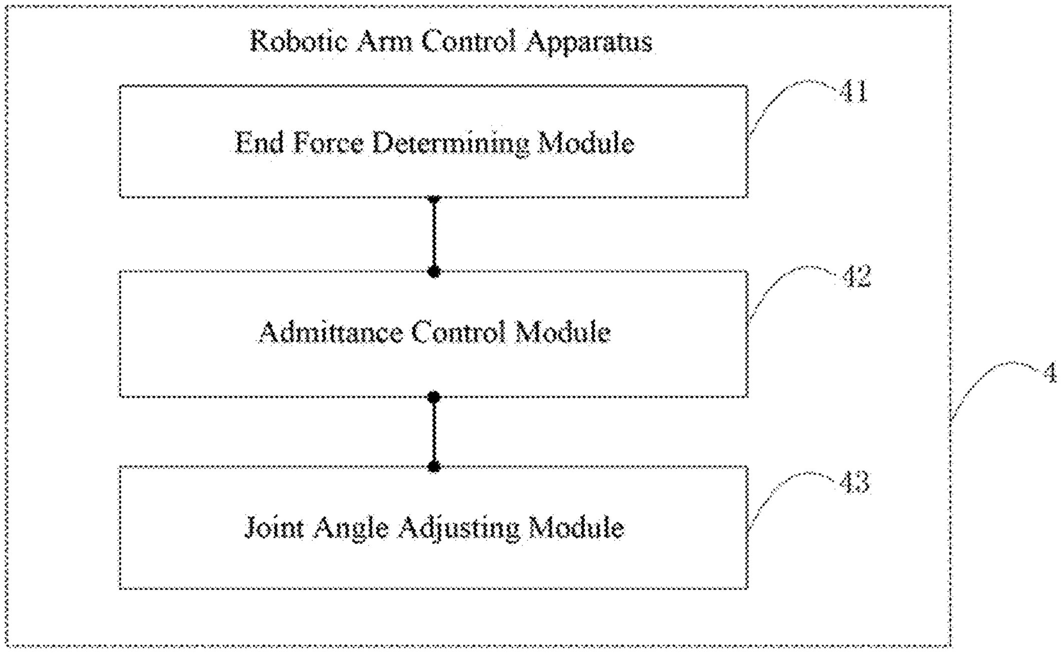
FIG. 4 is a schematic diagram of the structure of a robotic arm control apparatus according to an embodiment of the present disclosure.
Figure 5:
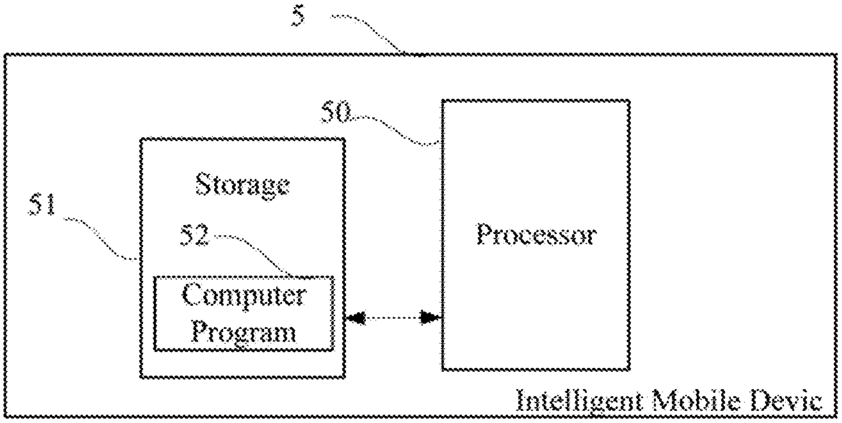
FIG. 5 is a schematic diagram of an intelligent mobile device according to an embodiment of the present disclosure.

FIG. 1 is a flow chart of a robotic arm control method according to an embodiment of the present disclosure. In this embodiment, a robotic arm control method for a robot having a plurality of robotic arms (manipulators) each having an end-effector may be applied on (a processor of) the robot. In other embodiments, the method may be implemented through a robotic arm control apparatus as shown in FIG. 4, or an intelligent mobile device as shown in FIG. 5. As shown in FIG. 1, in this embodiment, the robotic arm control method may include the following steps.

S11: obtaining N end forces applied to the end-effectors of N robotic arms among the robotic arms of the robot, in response to detecting that the N robotic arms clamp the same object, where N is a natural number larger than or equal to 2.

Specifically, when it is detected that more than one robotic arm has clamped (grasp) an object (e.g., a to-be-assembled object), a sensor may be used to detect whether the object clamped by these robotic arms is the same object. In which, this sensor may be an image sensor, a radar sensor, or the like.

For example, when the sensor is the image sensor, the image of the object clamped by the robotic arms may be obtained through the image sensor, and the object in the image may be identified to determine whether the object clamped by the robotic arms is the same object.

In this embodiment, a force sensor may be installed at the end-effector of the robotic arm to measure the force applied to (e.g., exerted on) the end. Specifically, a force sensor may be installed at the end-effector of each of the robotic arms, so that the force applied to the end-effector the corresponding robotic arm can be obtained through each force sensor.

It should be noted that if a plurality of the robotic arms of the robot clamp two or more objects at the same time, for example, robotic arm 1 and robotic arm 2 clamp object 1, while robotic arm 3 and robotic arm 4 clamp object 2, then the force applied to the end-effector robotic arm 1 and that applied to the end-effector robotic arm 2 (i.e., the end force corresponding to object 1) are respectively obtained, and the force applied to the end-effector robotic arm 3 and that applied to the end-effector robotic arm 4 (i.e., the end force corresponding to object 2) are respectively obtained. Then, in the subsequent processing, the end forces corresponding to different objects are respectively used.

As an example, because only when two or more robotic arms clamp the same object, these robotic arms will be affected by internal stress, if it is detected that only one robotic arm clamps the object, the force applied to the end-effector of the robotic arm may not be obtained.

S12: performing, according to the N end forces, an admittance control for eliminating an internal stress of the N end-effectors on the N robotic arms.

In which, the admittance control refers to controlling the end-effector of the robotic arm to move according to the force and torque applied to the end-effectors of the robotic arms.

Specifically, the admittance control may be performed, according to each end force, on its corresponding robotic arm; alternatively, the admittance control may be performed, according to a calculated resultant force of the N end forces, on the N robotic arms.

In this embodiment, after the admittance control is performed, the obtained result of the admittance control may include the displacement of the robotic arms.

S13: adjusting, according to results of the admittance control on the N robotic arms, joint angles of the N robotic arms.

Specifically, the joint angle corresponding to the robotic arms may be determined according to the displacement of the robotic arms included in the result of the admittance control in combination with inverse kinematics.

In some embodiments, because the robot is actually performing a certain task when clamping the object, a trajectory corresponding to the task (which includes the trajectories of the robotic arms) is usually planned when or before performing the task, and the displacement of the robotic arm under the influence of other robotic arms may be determined according to the result of the admittance control after performing the admittance control on the robotic arm, the joint angle of the robotic arm may therefore be adjusted in a joint manner according to the planned trajectory and the displacement in the result of the admittance control, thereby improving the accuracy of the adjusted joint angle.

In this embodiment, when it is detected that two or more robotic arms of the robot clamp the same object, the N end forces is obtained by obtaining the forces applied to the end-effectors of the N robotic arms, and the admittance control is performed on the N robotic arms according to the N end forces, and then the joint angles of the N robotic arms is adjusted according to the results of the admittance control of the N robotic arms. Because the forces on different robotic arms will affect each other when the end-effectors of two or more robotic arms clamp the same object, that is, the internal stress at the end-effectors of the robotic arms clamping the same object will affect the movement of the robotic arms, the internal stress of these robotic arms can be eliminated after performing the admittance control on these robotic arms. Therefore, after adjusting the joint angles of the robotic arms according to the results of the admittance control of these robotic arms, the accuracy of the adjusted joint angles can be guaranteed, thereby improving the success rate of performing tasks.

In some embodiments, step S12 may include:

- for each of the N end forces, obtaining the result of the admittance control of the robotic arm corresponding to the end force by performing the admittance control on the robotic arm in a first target direction according to the end force.

In which, the first target direction may include at least one of rotation directions rx, ry, and rz that are corresponding directions of the end-effector to rotate around an x-axis, a y-axis, and a z-axis of a coordinate system of the robot, respectively.

Specifically, the rotation direction included in the first target direction is related to the end force. For example, if the directions corresponding to the component of the end force are rx and ry, the admittance control is performed on the robotic arm in the directions of rx and ry, where the first target direction is rx and ry. For another example, if the direction corresponding to the component of the end force is rx, the admittance control is performed on the robotic arm in the direction of rx, where the first target direction is rx. That is, in this embodiment, different end forces may correspond to different first target directions.

In this embodiment, the result of the admittance control may include the displacement of the robotic arm under the end force, such as the displacement of the robotic arm in the first target direction. Assuming that the displacement in a certain direction (or degree of freedom) is represented by $\delta_x$, which may be calculated using an equation of:

$$M\ddot{\delta}_x + B\dot{\delta}_x + K\delta_x = f_{ext} \tag{1}$$

The forgoing equation (1) describes a mass-spring-damper model, where M represents mass, B represents damping coefficient, K represents elastic coefficient, $\delta_x$ represents displacement, $\dot{\delta}_x$ represents velocity, $\ddot{\delta}_x$ represents acceleration, and $f_{ext}$ represents external force, that is, the end force of the robotic arm.

In this embodiment, according to the end force, the admittance control is performed on the corresponding robotic arm in the first target direction. Since the first target direction includes at least one of the rotation directions rx, ry, and rz, and the positional deviation generated in the rotation direction is likely to cause the failure to perform tasks, the success rate of performing tasks can be improved by performing the admittance control on the robotic arm in the first target direction.

In some embodiments, step S12 may include:

for each of the N end forces, obtaining the result of the admittance control of the robotic arm corresponding to the end force by performing the admittance control on the robotic arm in a second target direction according to the end force.

In which, the second target direction may include at least one of translation directions x, y, and z that are corresponding directions of an x-axis, a y-axis, and a z-axis of the above-mentioned coordinate system of the robot, respectively.

Specifically, the translation direction included in the second target direction is related to the end force. For example, if the directions corresponding to the component of the end force are x and y, the admittance control is performed on the robotic arm in the directions of x and y, where the second target direction is x and y. For another example, if the direction corresponding to the component of the end force is x, the admittance control is performed on the robotic arm in the direction of x, where the second target direction is x. That is, in this embodiment, different end forces may correspond to different second target directions.

In this embodiment, according to the end force, the admittance control is performed on the corresponding robotic arm in the second target direction. Since the second target direction includes at least one of the translation directions x, y, and z, and the positional deviation generated in the translation direction is likely to cause the failure to perform tasks, the success rate of performing tasks can be improved by performing the admittance control on the robotic arm in the second target direction.

In some embodiments, the admittance control may be performed on the robotic arm in the first target direction and the second target direction simultaneously, thereby further improving the effect of admittance control.

In some embodiments, the performing the admittance control on the corresponding robotic arm in the second target direction according to the end force may include the following steps.

A1: determining a stiffness of the robotic arm.

In which, the stiffness of the robotic arm is mainly related to the material of the robotic arm. In addition, it may also be related to the cross-sectional area and/or the shape of the robotic arm.

In this embodiment, the stiffness of the robotic arm may be determined according to the material, shape and cross-sectional area of the robotic arm. Specifically, it may set corresponding weights for the material, the shape, and the cross-sectional area, where the weight of the material is the largest, thereby improving the accuracy of the determined stiffness of the robotic arm when the stiffness is determined according to these weights.

Considering that once the robotic arm is manufactured, its material, shape and cross-sectional area usually do not change, the stiffness of the robotic arm may be calculated in advance, so that when it needs to perform the admittance control on the robotic arm, the stiffness of the robotic arm can be directly obtained, thereby improving the efficiency of obtaining the stiffness.

A2: performing, according to the end force, the admittance control on the corresponding robotic arm in the second target direction in response to the stiffness of the robotic arm being larger than a preset stiffness threshold.

As an example, when the stiffness of the robotic arm is larger than the preset stiffness threshold, the admittance control may be performed on the robotic arm in the second target direction and the first target direction according to the end force.

As an example, when the stiffness of the robotic arm is not larger than the preset stiffness threshold, the admittance control may be performed on the robotic arm only in the first target direction according to the end force.

In this embodiment, because the larger the stiffness, the smaller the flexibility of the robotic arm, that is, the higher the requirement for the positional accuracy of the robotic arm, the admittance control is performed on the robotic arm in the second target direction or in both the first target direction and the second target direction when it is determined that the stiffness is large, while the admittance control is performed on the robotic arm in only the first target direction when it is determined that the stiffness is small, which can not only effectively save resources but also ensure the effective elimination of internal stress.

In some embodiments, it is assumed that the task currently performed by the robot includes assembling the above-mentioned (to-be-assembled) object, that is, the current task performed by the robot is an assembly task, and in the process of realizing the assembly, an assembly trajectory needs to be followed to complete the assembly. Since the positional error will cause great resistance, the positional error in the assembly process is likely to cause assembly failure. In order to increase the probability of successful assembly, it is necessary to enable the object to appropriately change its motion trajectory (i.e., change the predetermined assembly trajectory) according to the external force during following the assembly trajectory. At this time, after step S13, the robotic arm control method may include:

B1: performing, according to a force applied to the object, an admittance control on the object during assembling the object through M robotic arms of the robot, where M is a natural number larger than or equal to 2; and B2: adjusting, according to a result of the admittance control performed on the object, the joint angles of the M robotic arms.

In which, the force applied to the object refers to the various forces applied to (e.g., exerted on) the object.

In this embodiment, the robotic arm for clamping the object may be different from the robotic arm for assembling the object, and only the robotic arm for assembling the object needs to be considered when performing the admittance control on the object.

In this embodiment, it may determine the point of assembly position in advance according to the assembly task, and determine that the robotic arm is assembling the object when the robot reaches the point of assembly position of the object. Alternatively, it may also determine that the robotic arm is assembling the object only when it is detected that the object has reached the assembly position point and collides with another object.

In this embodiment, after the admittance control is performed on the object, the result of the admittance control, that is, the displacement of the object can be obtained. Since the displacement of the object is controlled by M robotic arms among the robotic arms of the robot, adjusting the joint angles of the M robotic arms according to the result of the admittance control of the object can realize the adjustment of the displacement of the object, that is, it can improve the accuracy of the motion trajectory of the object during the assembly process, thereby improving the success rate of assembling the object.

In some embodiments, the performing, according to the force applied to the object, the admittance control on the object in step B1 may include:

C1: determining a force exerted on the object by an external object in contact with the object and a gravity of the object; and C2: performing, according to the force exerted on the object and the gravity, the admittance control on the object.

Specifically, since the to-be-assembled object is assembled through the M robotic arms, the external objects in contact with the to-be-assembled object must include the M robotic arms. In addition, when the to-be-assembled object is in contact with other objects, the to-be-assembled object will also be subject to the force exerted by other objects. At this time, the external objects in contact with the to-be-assembled object include the M robotic arms and other objects.

In this embodiment, the gravity of the object may be determined according to the mass and center of mass (centroid) of the object.

In this embodiment, since not only the force exerted on the object by the object in contact with the object but also the gravity applied to the object are considered when determining the force applied to the object, the accuracy of the force applied to the object can be improved, thereby improving the accuracy after performing the admittance control on the object.

In some embodiments, the robotic arm control method may further include the following steps D1: determining an error according to the force applied to the object and an expected force during assembling the object through M robotic arms of the robot, where the expected force is determined according to the task of assembling the object (i.e., the assembly task).

In which, the force applied to the object includes at least the gravity of the object and the force exerted on the object by the M robotic arms.

As an example, the force applied to the object may be continuously obtained by force tracking.

Figure 2:
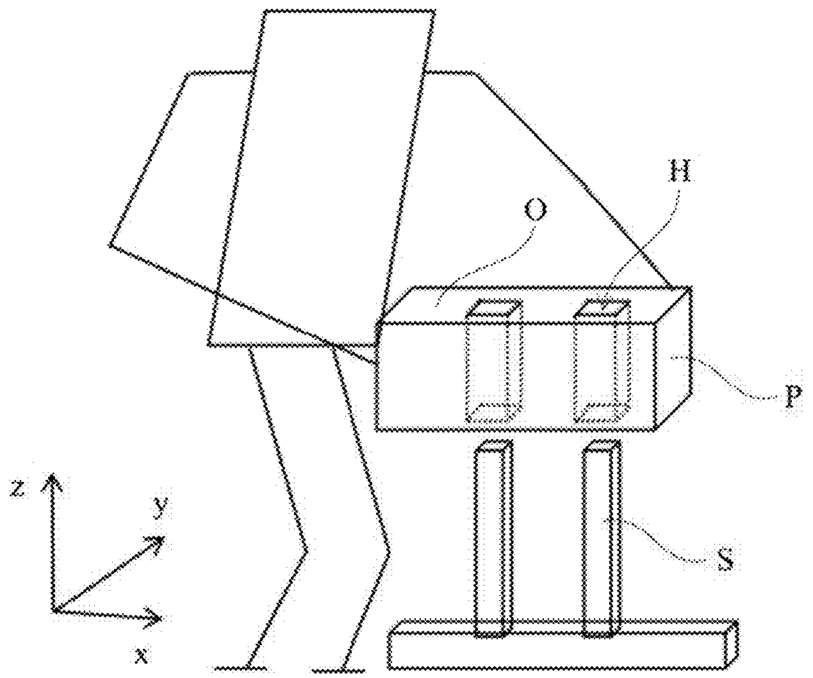
FIG. 2 is a schematic diagram of the scene of a shaft hole assembly task according to an embodiment of the present disclosure.

As an example, the direction in which force tracking is required may be determined according to the task of assembling the object, and then the force applied to the object may be determined according to the determined direction. For example, when the task of assembling the object is a shaft hole assembly task, it will include two steps: searching for the position of the hole; and pressing down during the searching. After performing these two steps, the shaft may be pushed into the hole when the hole is found. FIG. 2 is a schematic diagram of the scene of a shaft hole assembly task according to an embodiment of the present disclosure. As shown in FIG. 2, in the shaft hole assembly task, since it presses the plate P down after the hole H faces the shaft S, it only needs to enable a force tracking mode in the direction of the shaft S (assuming that the direction of the shaft S is the z direction) to track the force applied to the object O. In addition, it may also enable an admittance mode in the above-mentioned first target direction and/or the above-mentioned second target direction to perform the admittance control on the object O.

D2: determining displacements of the M robotic arms according to the error.

Specifically, assuming that the force (or torque) to be tracked on a certain degree of freedom is $f_d$, and the actual force is f, then the force tracking error will be $f_e=f_d-f$, and the acceleration of the movement on this degree of freedom may be calculated using an equation of:

$$\ddot{\delta}_x = K_p f_e + K_i \int f_e + K_d \dot{f}_e \tag{2}$$

In equation (2), $K_p$, $K_i$, and $K_d$ are PID parameters that are proportional coefficient, integral time, and differential time, respectively. After integrating equation (2) twice, the corresponding displacement will be obtained.

Correspondingly, step B2 may include:

adjusting, based on the result of the admittance control performed on the object and the displacements of the M robotic arms, the joint angles of the M robotic arms.

Specifically, the displacement corresponding to the M robotic arms (assumed as the first displacement) may be determined according to the result of the admittance control (which includes the corresponding displacement of the object) obtained by performing the admittance control on the object, and the final displacement corresponding to the M robotic arms may be determined according to the first displacement and the displacement corresponding to the M robotic arms that is determined based on the force tracking on the object (assumed as the second displacement), and then the joint angles of the M robotic arms may be adjusted according to the final displacements.

Since there is usually a difference between the force applied to the object and the expected force during assembling the object through the M robotic arms, an error may be determined according to the force applied to the object and the expected force, and the displacement of the M robotic arms may be determined according to the error, so that the displacement of the M robotic arms can be calibrated in time, which is conducive to improving the success rate of the robot to perform tasks.

Figure 3:
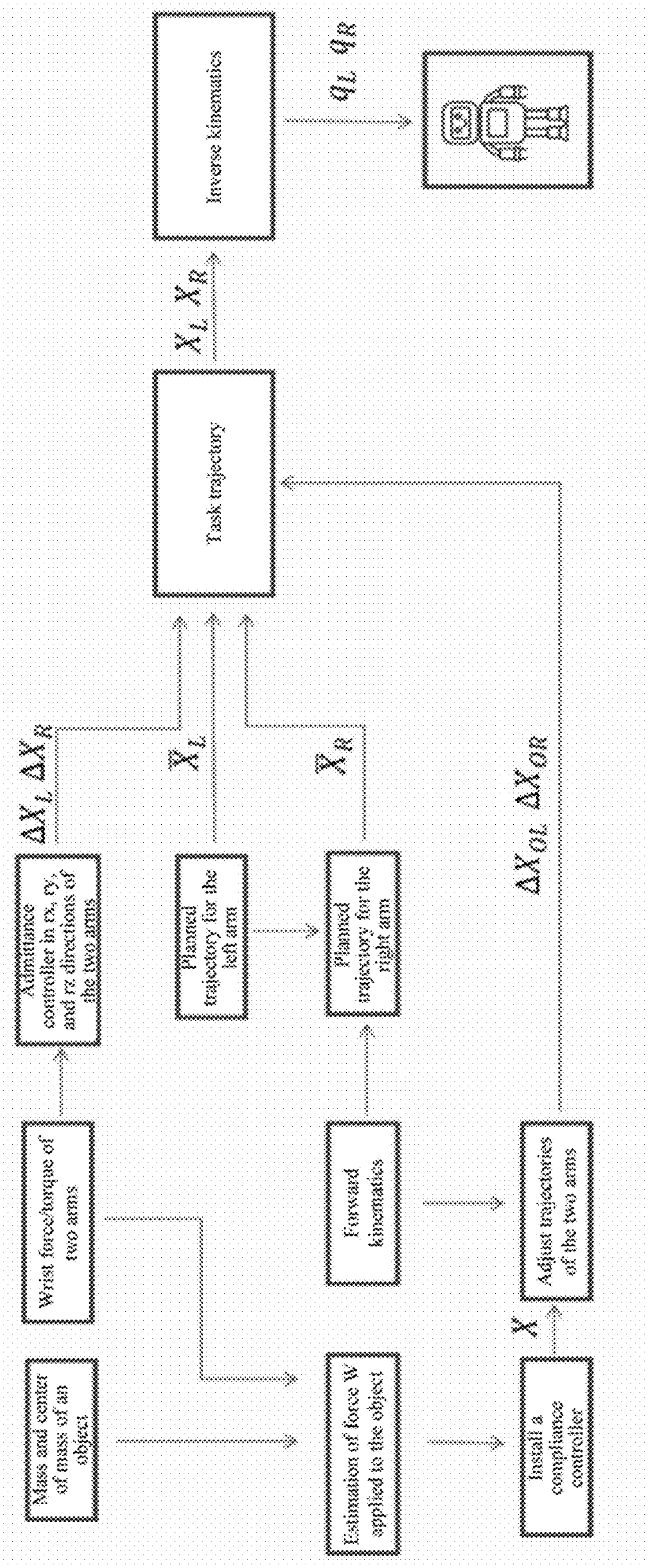
FIG. 3 is a flow chart of another robotic arm control method according to an embodiment of the present disclosure.

FIG. 3 is a flow chart of another robotic arm control method according to an embodiment of the present disclosure. As shown in FIG. 3, in this embodiment, another robotic arm control method is provided.

In FIG. 3, it is assumed that the robot performs the task through two robotic arms (i.e., a left robotic arm and a right robotic arm).

When the two robotic arms of the robot clamp the same object, the robot may determine a wrist force (or a wrist torque) of the two robotic arm (i.e., the above-mentioned end force), and may perform the admittance control in the first target direction (e.g., the three rotation directions of rx, ry, and rz) of the two robotic arms, respectively (the admittance control may also be performed in the second target direction at the same time) according to the wrist force (or the wrist torque) of the two robotic arm to obtain the corresponding result of the admittance control. The result of the admittance control may include the corresponding displacement of the left robotic arm (i.e., $\Delta X_L$ in FIG. 3) and the corresponding displacement of the right robotic arm (i.e., $\Delta X_R$ in FIG. 3).

When the robot performs the task of assembling the object, during assembling the object, the robot may estimate the force applied to the object (also called the external force) based on the mass and center of mass of the object and the wrist force of the two robotic arms of the robot, and a compliance controller installed on the robot may perform the admittance control on the object according to the force applied to the object and determine the displacements X of the two robotic arms based on the force applied to the object and the expected force, and then the robot may adjust the trajectories of the left and right robotic arms based on the displacements X of the left and right robotic arms output by the compliance controller to obtain the adjusted displacements $\Delta X_{OL}$ and $\Delta X_{OR}$.

The final trajectories $X_L$ and $X_R$ may be determined according to $\Delta X_L$, $\Delta X_R$, $\Delta X_{OL}$, $\Delta X_{OR}$, and a pre-planned left arm planning trajectory $\Delta\overline{X_L}$ (i.e. the trajectory of the left robotic arm) and a pre-planned right arm planning trajectory $\Delta\overline{X_R}$ (i.e. the trajectory of the right robotic arm), and then the joint angles $q_L$ and $q_R$ corresponding to the left and right robotic arms may be obtained by inverse kinematics processing.

It should be noted that in FIG. 3, the right arm planning trajectory refers to the left arm planning trajectory. Alternatively, the left arm planning trajectory may refer to the right arm planning trajectory.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 4 is a schematic diagram of the structure of a robotic arm control apparatus according to an embodiment of the present disclosure. In this embodiment, an apparatus for controlling the above-mentioned robot may be implemented as a controller of the above-mentioned robot. The robotic arm control apparatus corresponding to the robotic arm control method in the forgoing embodiment is provided. For ease of explanation, only the parts related to this embodiment are shown.

As shown in FIG. 4, the robotic arm control apparatus 4 may be applied on the intelligent mobile device as shown in FIG. 5, which may include an end force determining module 41, an admittance control module 42, and a joint angle adjusting module 43. In which:

- the end force determining module 41 is configured to obtain N end forces applied to the end-effectors of N robotic arms of the robot, in response to detecting that the N robotic arms clamp the same object, where N is a natural number larger than or equal to 2;
- the admittance control module 42 is configured to perform, according to the N end forces, an admittance control for eliminating an internal stress of the N end-effectors on the N robotic arms; and
- the joint angle adjusting module 43 is configured to adjust, according to results of the admittance control on the N robotic arms, joint angles of the N robotic arms.

In this embodiment, when it is detected that two or more robotic arms of the robot clamp the same object, the N end forces is obtained by obtaining the forces applied to the end-effectors of the N robotic arms, and the admittance control is performed on the N robotic arms according to the N end forces, and then the joint angles of the N robotic arms is adjusted according to the results of the admittance control of the N robotic arms. Because the forces on different robotic arms will affect each other when the end-effectors of two or more robotic arms clamp the same object, that is, the internal stress at the end-effectors of the robotic arms clamping the same object will affect the movement of the robotic arms, the internal stress of these robotic arms can be eliminated after performing the admittance control on these robotic arms. Therefore, after adjusting the joint angles of the robotic arms according to the results of the admittance control of these robotic arms, the accuracy of the adjusted joint angles can be guaranteed, thereby improving the success rate of performing tasks.

In some embodiments, the admittance control module 42 may be configured to:

- for each of the N end forces, obtain the result of the admittance control of the robotic arm corresponding to the end force by performing the admittance control on the robotic arm in a first target direction according to the end force.

In which, the first target direction may include at least one of rotation directions rx, ry, and rz that are corresponding directions of rotating around an x-axis, a y-axis, and a z-axis of the above-mentioned coordinate system of the robot, respectively.

In some embodiments, the admittance control module 42 may be configured to:

- for each of the N end forces, obtaining the result of the admittance control of the robotic arm corresponding to the end force by performing the admittance control on the robotic arm in a second target direction according to the end force.

In which, the second target direction may include at least one of translation directions x, y, and z that are corresponding directions of an x-axis, a y-axis, and a z-axis of the above-mentioned coordinate system of the robot, respectively.

In some embodiments, the performing the admittance control on the corresponding robotic arm in the second target direction according to the end force may include:

- determining a stiffness of the robotic arm; and
- performing, according to the end force, the admittance control on the corresponding robotic arm in the second target direction in response to the stiffness of the robotic arm being larger than a preset stiffness threshold.

In some embodiments, the task currently performed by the robot may include assembling the above-mentioned (to-be-assembled) object, and the robotic arm control apparatus 4 may further include:

- an object compliance module configured to, after adjusting, according to results of the admittance control on the N robotic arms, joint angles of the N robotic arms, perform, according to a force applied to the object, an admittance control on the object during assembling the object through M robotic arms of the robot, where M is a natural number larger than or equal to 2; and
- a joint angle adjusting module configured to adjust, according to a result of the admittance control performed on the object, the joint angles of the M robotic arms.

In some embodiments, the performing, according to the force applied to the object, an admittance control on the object may include:

- determining a force exerted on the object by an external object in contact with the object and a gravity of the object; and performing, according to the force exerted on the object and the gravity, the admittance control on the object.

In some embodiments, the robotic arm control apparatus 4 may further include:

an error determining module configured to determine an error according to the force applied to the object and an expected force during assembling the object through M robotic arms of the robot, where the expected force is determined according to the task of assembling the object (i.e., the assembly task).

an error displacement determining module configured to determine displacements of the M robotic arms according to the error.

Correspondingly, the above-mentioned joint angle adjusting module 43 may be configured to:

adjust, based on the result of the admittance control performed on the object and the displacements of the M robotic arms, the joint angles of the M robotic arms.

It should be noted that, the information exchange, execution process and other contents between the above-mentioned device/units are based on the same concept as the method embodiments of the present disclosure. For the specific functions and technical effects, please refer to the method embodiments, which will not be repeated herein.

FIG. 5 is a schematic diagram of an intelligent mobile device according to an embodiment of the present disclosure. As shown in FIG. 5, in this embodiment, the intelligent mobile device 5 includes at least a processor 50 (only one is shown in FIG. 5), a storage 51, and a computer program 52 stored in the storage 51 and executable on the processor 50. When executing (instructions in) the computer program 52, the processor 50 implements the steps in the above-mentioned method embodiment.

The intelligent mobile device 5 may be a robot with two robotic arms or more. The robot may be a humanoid robot or a robot of other types. The intelligent mobile device 5 may include, but is not limited to, the processor 50 and the storage 51. It can be understood by those skilled in the art that FIG. 5 is merely an example of the intelligent mobile device 5 and does not constitute a limitation on the intelligent mobile device 5, and may include more or fewer components than those shown in the figure, or a combination of some components or different components. For example, the intelligent mobile device 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

In some embodiments, the storage 51 may be an internal storage unit of the intelligent mobile device 5, for example, a hard disk or a memory of the intelligent mobile device 5. In other embodiments, the storage 51 may also be an external storage device of the intelligent mobile device 5, for example, a plug-in hard disk, a smart media card (SMC), a secure digital (SD) card, flash card, and the like, which is equipped on the intelligent mobile device 5. Furthermore, the storage 51 may further include both an internal storage unit and an external storage device, of the intelligent mobile device 5. The storage 51 is configured to store xx. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

The embodiments of the present disclosure also provide a network device which may include at least one processor, a storage, and computer program(s) stored in the storage and executable on the at least one processor, where the steps in any of the above-mentioned method embodiments is implemented when the processor executes the computer program(s).

The embodiments of the present disclosure also provide a computer-readable storage medium which stores computer program(s), where the steps in any of the above-mentioned method embodiments can be implemented when the computer program(s) are executed by a processor.

The embodiments of the present disclosure also provide a computer program product. When the computer program product is executed on an intelligent mobile device, the steps in any of the above-mentioned method embodiments can be implemented.

When the integrated unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program.

The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may at least include any entity or device capable of carrying computer program codes to a camera device/intelligent mobile device, a recording medium, a computer memory, a read-only memory (ROM), a random access memory (RAM), electric carrier signals, telecommunication signals and software distribution media. For example, a USB flash drive, a portable hard disk, a magnetic disk, an optical disk, or the like. In some jurisdictions, according to the legislation and patent practice, a computer readable medium cannot be electric carrier signals and telecommunication signals.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/network device and method may be implemented in other manners. For example, the above-mentioned apparatus/network device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A method for controlling a plurality of robotic arms of a robot, comprising:

obtaining an end force applied to an end-effector of each of the robotic arms of the robot, in response to detecting that the robotic arms clamp a same object;

performing, according to the end force applied to the end-effector of each of the robotic arms, an admittance control for eliminating an internal stress of the end-effectors of the robotic arms on each of the robotic arms; and adjusting, according to a result of the admittance control performed on each of the robotic arms, a joint angle of each of the robotic arms;

wherein performing, according to the end force applied to the end-effector of each of the robotic arms, the admittance control on each of the robotic arms comprises:

obtaining the result of the admittance control performed on each of the robotic arms by performing the admittance control on each of the robotic arms in a second target direction according to the end force applied to the end-effector of each of the robotic arms, wherein the second target direction includes at least one of a translation direction x being a corresponding direction of an x-axis, a translation direction y being a corresponding direction of a y-axis, and a translation direction z being a corresponding direction of a z-axis; and wherein performing the admittance control on each of the robotic arms in the second target direction according to the end force applied to the end-effector of each of the robotic arms comprises:

determining a stiffness of each of the robotic arms; and performing, according to the end force applied to the end-effector of each of the robotic arms, the admittance control on each of the robotic arms in the second target direction in response to the stiffness of each of the robotic arms being larger than a preset stiffness threshold.

2. The method of claim 1, wherein performing, according to the end force applied to the end-effector of each of the robotic arms, the admittance control on each of the robotic arms comprises:

obtaining the result of the admittance control performed on each of the robotic arms by performing the admittance control on each of the robotic arms in a first target direction according to the end force applied to the end-effector of each of the robotic arms, wherein the first target direction includes at least one of a rotation direction rx being a corresponding direction of the end-effector of each of the robotic arms to rotate around an x-axis, a rotation direction ry being a corresponding direction of the end-effector of each of the robotic arms to rotate around a y-axis, and a rotation direction rz being a corresponding direction of the end-effector of each of the robotic arms to rotate around a z-axis.

3. The method of claim 1, wherein a current task performed by the robot includes assembling the object, after adjusting, according to the result of the admittance control performed on each of the robotic arms, the joint angle of each of the robotic arms, the method further comprises:

performing, according to a force applied to the object, an admittance control on the object during assembling the object through at least two among the robotic arms of the robot; and adjusting, according to a result of the admittance control performed on the object, the joint angles of the at least two among the robotic arms.

4. The method of claim 3, wherein performing, according to the force applied to the object, an admittance control on the object comprises:

determining a force exerted on the object by an external object in contact with the object and a gravity of the object; and performing, according to the force exerted on the object and the gravity, the admittance control on the object.

5. The method of claim 3, further comprising:

determining an error according to the force applied to the object and an expected force during assembling the object through at least two among the robotic arms of the robot, wherein the expected force is determined according to the task performed by the robot including assembling the object;

determining displacements of the at least two among the robotic arms according to the error;

adjusting, according to the result of the admittance control performed on the object, the joint angles of the at least two among the robotic arms comprises:

adjusting, based on the result of the admittance control performed on the object and the displacements of the at least two among the robotic arms, the joint angles of the at least two among the robotic arms.

6. The method of claim 1, wherein performing, according to the end force applied to the end-effector of each of the robotic arms, the admittance control on each of the robotic arms comprises:

calculating a resultant force of the end forces of the robotic arms; and performing, according to the calculated resultant force, the admittance control on each of the robotic arms.

7. An intelligent mobile device, comprising:

a plurality of robotic arms each having an end-effector;

a processor;

a memory coupled to the processor; and one or more computer programs stored in the memory and executable on the processor;

wherein, the one or more computer programs comprise:

instructions for obtaining an end force applied to the end-effector of each of the robotic arms, in response to detecting that the robotic arms clamp a same object;

instructions for performing, according to the end force applied to the end-effector of each of the robotic arms, an admittance control for eliminating an internal stress of the end-effectors of the robotic arms on each of the robotic arms; and instructions for adjusting, according to a result of the admittance control performed on each of the robotic arms, a joint angle of each of the robotic arms;

wherein a current task performed by the robot includes assembling the object; and the one or more computer programs further comprise:

instructions for performing, according to a force applied to the object, an admittance control on the object during assembling the object through at least two among the robotic arms of the robot; and instructions for adjusting, according to a result of the admittance control performed on the object, the joint angles of the at least two among the robotic arms; and wherein the one or more computer programs further comprises:

instructions for determining an error according to the force applied to the object and an expected force during assembling the object through at least two among the robotic arms of the robot, wherein the expected force is determined according to the task performed by the robot including assembling the object;

instructions for determining displacements of the at least two among the robotic arms according to the error;

the instructions for adjusting, according to the result of the admittance control performed on the object, the joint angles of the at least two among the robotic arms comprise:

instructions for adjusting, based on the result of the admittance control performed on the object and the displacements of the at least two among the robotic arms, the joint angles of the at least two among the robotic arms.

8. The device of claim 7, wherein the instructions for performing, according to the end force applied to the end-effector of each of the robotic arms, the admittance control on each of the robotic arms comprise:

instructions for obtaining the result of the admittance control performed on each of the robotic arms by performing the admittance control on each of the robotic arms in a first target direction according to the end force applied to the end-effector of each of the robotic arms, wherein the first target direction includes at least one of a rotation direction rx being a corresponding direction of the end-effector of each of the robotic arms to rotate around an x-axis, a rotation direction ry being a corresponding direction of the end-effector of each of the robotic arms to rotate around a y-axis, and a rotation direction rz being a corresponding direction of the end-effector of each of the robotic arms to rotate around a z-axis.

9. The device of claim 7, wherein the instructions for performing, according to the end force applied to the end-effector of each of the robotic arms, the admittance control on each of the robotic arms comprise:

instructions for obtaining the result of the admittance control performed on each of the robotic arms by performing the admittance control on each of the robotic arms in a second target direction according to the end force applied to the end-effector of each of the robotic arms, wherein the second target direction includes at least one of a translation direction x being a corresponding direction of an x-axis, a translation direction y being a corresponding direction of a y-axis, and a translation direction z being a corresponding direction of a z-axis.

10. The device of claim 9, wherein the instructions for performing the admittance control on each of the robotic arms in the second target direction according to the end force applied to the end-effector of each of the robotic arms comprise:

instructions for determining a stiffness of each of the robotic arms; and instructions for performing, according to the end force applied to the end-effector of each of the robotic arms, the admittance control on each of the robotic arms in the second target direction in response to the stiffness of each of the robotic arms being larger than a preset stiffness threshold.

11. The device of claim 7, wherein the instructions for performing, according to the force applied to the object, an admittance control on the object comprise:

instructions for determining a force exerted on the object by an external object in contact with the object and a gravity of the object; and instructions for performing, according to the force exerted on the object and the gravity, the admittance control on the object.

12. The device of claim 7, wherein the instructions for performing, according to the end force applied to the end-effector of each of the robotic arms, the admittance control on each of the robotic arms comprise:

instructions for calculating a resultant force of the end forces of the robotic arms; and instructions for performing, according to the calculated resultant force, the admittance control on each of the robotic arms.

13. A non-transitory computer-readable storage medium for storing one or more computer programs, wherein the one or more computer programs comprise:

instructions for obtaining an end force applied to an end-effector of each of robotic arms of a robot, in response to detecting that the robotic arms clamp a same object;

instructions for performing, according to the end force applied to the end-effector of each of the robotic arms, an admittance control for eliminating an internal stress of the end-effectors of the robotic arms on each of the robotic arms, wherein the internal stress is generated by control errors for positions of the robotic arms when clamping the same object, and is formed by mutual offset of forces applied by end-effectors of different robotic arms, and wherein the admittance control is performed on each of the robotic arms in response to detecting that the robotic arms clamp the same object; and instructions for adjusting, according to a result of the admittance control performed on each of the robotic arms, a joint angle of each of the robotic arms.

14. The storage medium of claim 13, wherein the instructions for performing, according to the end force applied to the end-effector of each of the robotic arms, the admittance control on each of the robotic arms comprise:

instructions for obtaining the result of the admittance control performed on each of the robotic arms by performing the admittance control on each of the robotic arms in a first target direction according to the end force applied to the end-effector of each of the robotic arms, wherein the first target direction includes at least one of a rotation direction rx being a corresponding direction of the end-effector of each of the robotic arms to rotate around an x-axis, a rotation direction ry being a corresponding direction of the end-effector of each of the robotic arms to rotate around a y-axis, and a rotation direction rz being a corresponding direction of the end-effector of each of the robotic arms to rotate around a z-axis.

15. The storage medium of claim 13, wherein the instructions for performing, according to the end force applied to the end-effector of each of the robotic arms, the admittance control on each of the robotic arms comprise:

instructions for obtaining the result of the admittance control performed on each of the robotic arms by performing the admittance control on each of the robotic arms in a second target direction according to the end force applied to the end-effector of each of the robotic arms, wherein the second target direction includes at least one of a translation direction x being a corresponding direction of an x-axis, a translation direction y being a corresponding direction of a y-axis, and a translation direction z being a corresponding direction of a z-axis.

16. The storage medium of claim 15, wherein the instructions for performing the admittance control on each of the robotic arms in the second target direction according to the end force applied to the end-effector of each of the robotic arms comprise:

instructions for determining a stiffness of each of the robotic arms; and instructions for performing, according to the end force applied to the end-effector of each of the robotic arms, the admittance control on each of the robotic arms in the second target direction in response to the stiffness of each of the robotic arms being larger than a preset stiffness threshold.

17. The storage medium of claim 13, wherein a current task performed by the robot includes assembling the object; and the one or more computer programs further comprise:

instructions for performing, according to a force applied to the object, an admittance control on the object during assembling the object through at least two among the robotic arms of the robot; and instructions for adjusting, according to a result of the admittance control performed on the object, the joint angles of the at least two among the robotic arms.

18. The storage medium of claim 17, wherein the instructions for performing, according to the force applied to the object, an admittance control on the object comprise:

instructions for determining a force exerted on the object by an external object in contact with the object and a gravity of the object; and instructions for performing, according to the force exerted on the object and the gravity, the admittance control on the object.

19. The storage medium of claim 17, wherein the one or more computer programs further comprises:

instructions for determining an error according to the force applied to the object and an expected force during assembling the object through at least two among the robotic arms of the robot, wherein the expected force is determined according to the task performed by the robot including assembling the object;

instructions for determining displacements of the at least two among the robotic arms according to the error;

the instructions for adjusting, according to the result of the admittance control performed on the object, the joint angles of the at least two among the robotic arms comprise:

instructions for adjusting, based on the result of the admittance control performed on the object and the displacements of the at least two among the robotic arms, the joint angles of the at least two among the robotic arms.

20. The storage medium of claim 13, wherein the instructions for performing, according to the end force applied to the end-effector of each of the robotic arms, the admittance control on each of the robotic arms comprise:

instructions for calculating a resultant force of the end forces of the robotic arms; and instructions for performing, according to the calculated resultant force, the admittance control on each of the robotic arms.

* * * * *